No. 887,878. PATENTED MAY 19, 1908.
J. E. TUTTLE.
POWER TRANSMITTING MECHANISM.
APPLICATION FILED MAR. 22, 1907.
3 SHEETS—SHEET 1.
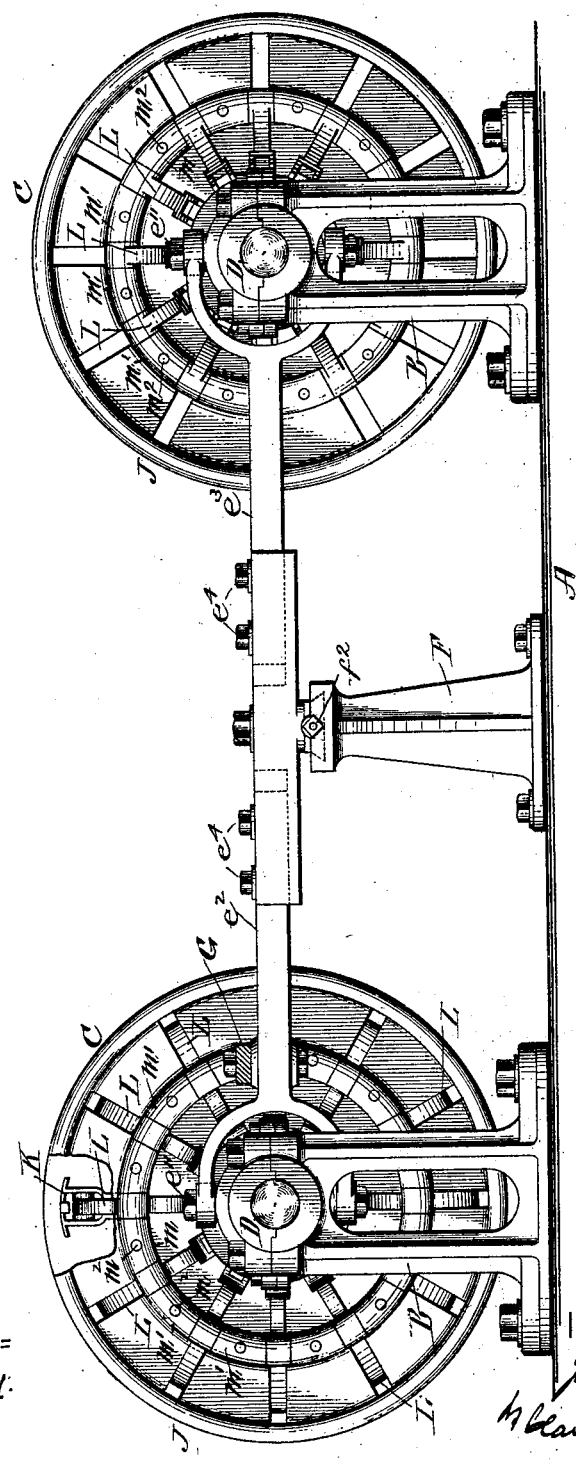

No. 887,878. PATENTED MAY 19, 1908.
J. E. TUTTLE.
POWER TRANSMITTING MECHANISM.
APPLICATION FILED MAR. 22, 1907.
3 SHEETS—SHEET 2.
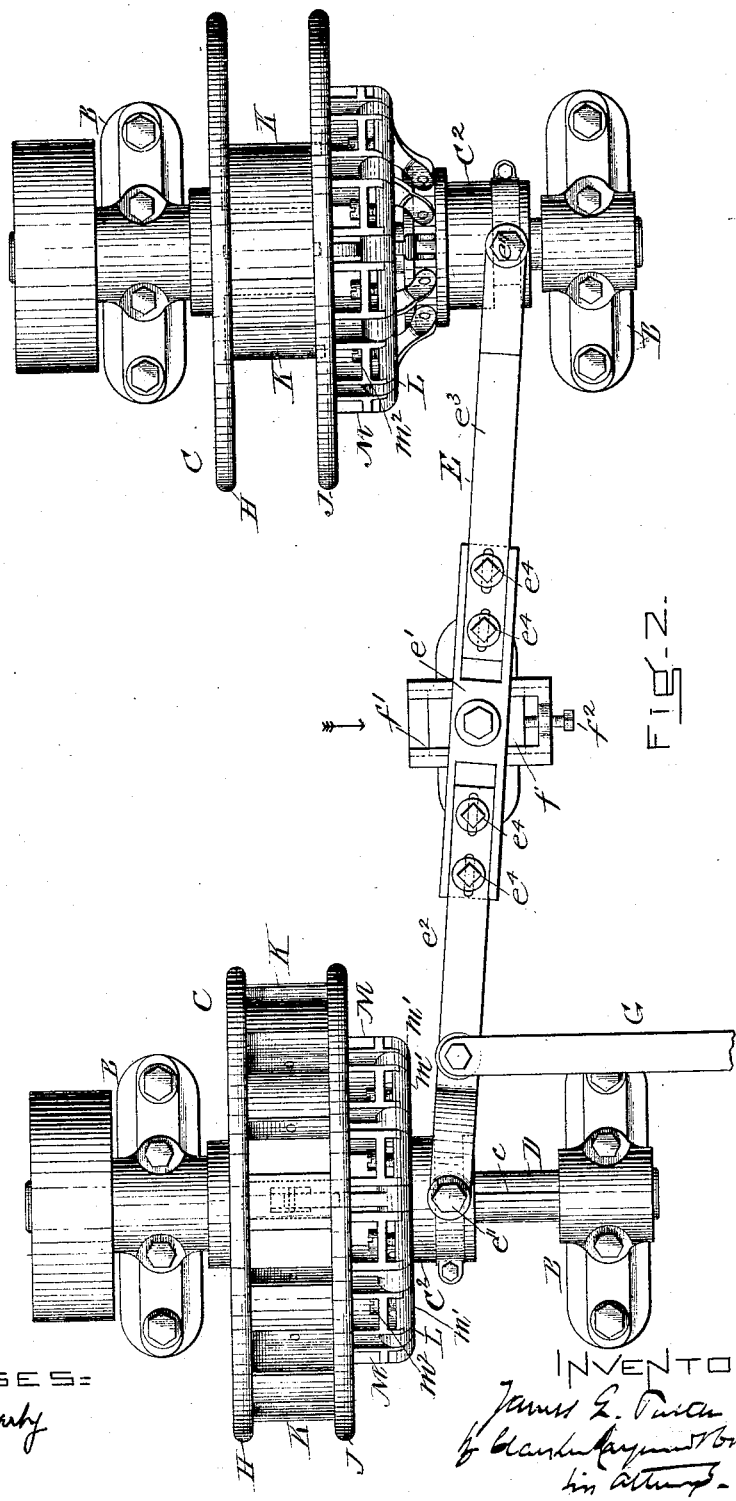
WITNESSES:
INVENTOR No. 887,878.
PATENTED MAY 19, 1908.
J. E. TUTTLE.
POWER TRANSMITTING MECHANISM.
APPLICATION FILED MAR. 22, 1907.
3 SHEETS—SHEET 3.
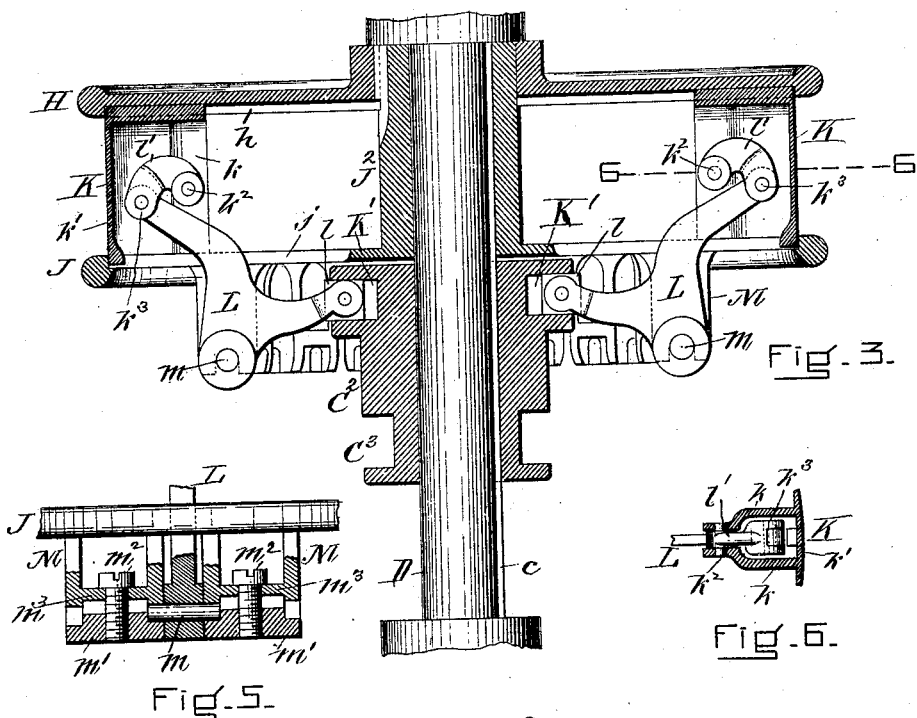
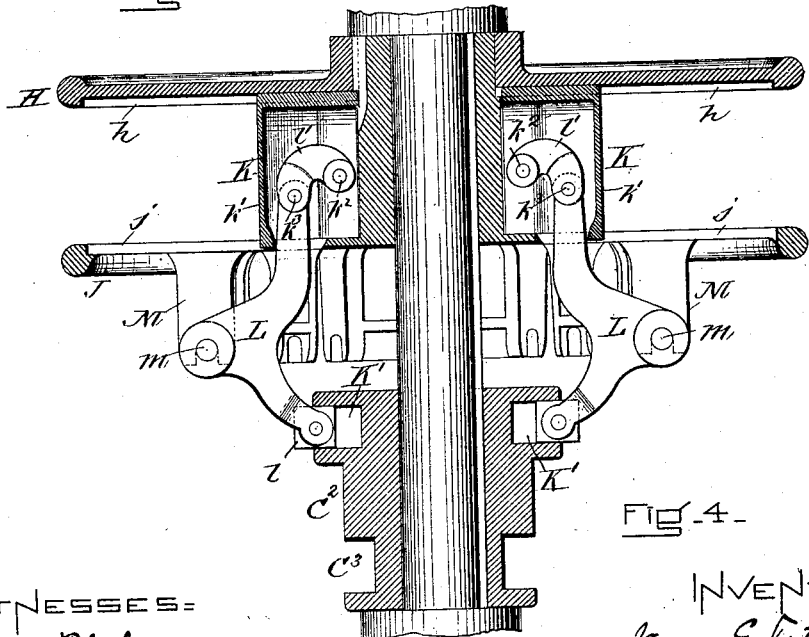
WITNESSES:
INVENTOR:

UNITED STATES PATENT OFFICE.

JAMES E. TUTTLE, OF WATERTOWN, MASSACHUSETTS.

POWER-TRANSMITTING MECHANISM.

No. 887,878.

Specification of Letters Patent.

Patented May 19, 1908.

Application filed March 22, 1907. Serial No. 363,973.

*To all whom it may concern:*

Be it known that I, JAMES E. TUTTLE, of Watertown, in the county of Middlesex and State of Massachusetts, a citizen of the United States, have invented a new and useful Improvement in Power-Transmitting Mechanism, of which the following is a specification.

My invention is intended for use in connection with power shafts in order that the speed taken from such shaft may be regulated, according to the requirements of the work to be done, by such means that the belt, transmitting power, shall always be maintained at the same tension.

It consists in certain details of construction which will be described below.

My invention will be understood by reference to the drawings in which is shown what appears to be the best form of its embodiment.

Figure 1 is an elevation, and Fig. 2 a plan of a power-transmitting mechanism embodying my invention, Fig. 3 being a section of one of the pulleys in its expanded position, and Fig. 4 a section of such pulley in its contracted position. Fig. 5 is a sectional detail of two of the clamps for holding the operating lever in place, and Fig. 6 is a section on line 6—6 of Fig. 3.

I have shown my power-transmitting mechanism mounted upon a floor A.

B, B, are bearings supported at a suitable height from the floor, each carrying a shaft D, D, in which is mounted one of said expanding pulleys C, C. As these two pulleys are identical in construction I shall describe only one of them. Each shaft carries a spline $c$, $c$, and on each shaft is a hub $C^2$, $C^2$ by means of which and the parts connected thereto the size of the pulley is regulated. The two hubs $C^2$, $C^2$ are connected by means of a lever E carrying at each end a yoke having pins $e^{11}$ which fit into a groove $C^3$ in the adjacent hub $C^2$. The lever E is fulcrumed in a block $f$ running in a slide $f^1$ mounted on the post F supported on the floor A. An adjusting screw $f^2$ binds against the block $f$ furnishing an adjustable back support therefor. As in pulleys of this class the tendency of the hubs $C^2$, $C^2$ is always to move in such direction as to allow the collapse of the pulley owing to the stress of the belt upon it, the tendency of this block will always be to move in the direction of the arrow (see Fig. 2), and hence its position may be regulated by the one adjusting screw $f^2$. The friction between the various parts of the pulley is ordinarily sufficient to keep each pulley adjusted.

I prefer that the lever E be extensible and for this purpose its center piece $e^1$ is grooved and carries at each end an arm $e^2$, $e^3$, the position of which in the center piece $e^1$ is adjustable by means of the clamp screws $e^4$. A shipper G attached to one of the arms, say $e^2$, is used to change the position of the lever and hence the hubs, when it is desired to change the size of the pulleys.

The pulleys themselves as shown are constructed in the following manner: Each pulley comprises two flanges H, J. In these flanges are provided slide-ways $h$, $j$ within which slides a section K of the periphery or bearing surface of the pulley. These sections are of such size that when all the sections are as close to the shaft as possible they will form a close and contracted periphery as shown in Figs. 1 and 2 and also in Fig. 4, and when expanded, although they will separate and form a broken periphery, they will give a sufficient bearing to the belt, as shown in Figs. 1 and 2 and in Fig. 3. The movement of these sections in and out from the shaft is controlled as follows: Each hub $C^2$ is grooved as at $K^1$ and in the groove are a series of blocks $l$ each of which carries pivoted therein one arm of the lever L. The fulcrum of each lever is mounted in a bearing on a bracket M projecting from the flange J. This bearing is slotted at the end and a pin $m$ passing through a hole in the lever L serves as a pivot pin for it. The ends of each pivot pin $m$ are held in place by clamp pieces $m^1$ which are suitably shaped (see especially Figs. 1, 2 and 5), to fit between the brackets M and one of the pins $m$ and form a finish to the pulley. Each is held in place by a screw $m^2$ which passes through a web $m^3$ connecting all the brackets.

The long arm of the lever L is connected to its section K by means of a link $l^1$. For this purpose the section is provided with side walls $k$ which project rearward from the face $k^1$ of the section and approach near their rear edge to form jaws between which one end of the link is pivoted by the pin $k^2$. The other end of the link is forked and between its prongs the end of the lever L is pivoted by the pin $k^3$.

Each of the pulleys shown in the drawings has twelve sections and a corresponding number of levers L, all the levers of the one pulley being operated by its hub C². In Figs. 3 and 4 moreover, I have only shown two levers in place though the brackets are shown. These levers L are approximately bell-crank in shape and their arrangement is such that as each hub C², C² is moved towards or from the pulley it carries the short arms of the levers with it, thus throwing the long arms of the levers outward towards the periphery of the pulley or inward toward its shaft as the case may be, thus moving the sections K with it. It is evident therefore that as the hub moves, all these levers acting in unison will cause each section K to move the same distance towards the outer edge of the flanges H, J, and hence will give to the belt a proper symmetrical bearing surface. To reduce the diameter of this bearing surface all that is necessary of course is to withdraw the hub again from the pulley, which carries the short arms of the levers with it and hence causes the bearing surface of the pulley to collapse or become smaller.

I prefer as a matter of construction that the flange J should have integral with it a sleeve J² on which the flange H shall be driven, or to which it shall be otherwise attached after the sections K are in place.

Referring now to Fig. 2, it will be noted that various adjustments of these parts can be had. By moving the shipper G the position of the lever E will be changed, thus increasing the size of one pulley and decreasing the size of the other, depending upon the direction in which the shipper G is moved.

The means for compensating the belt above referred to, viz: the change in the position of the block $f$, may be thus explained: If it is supposed that the lever E is in a line at right angles to the axes of the shafts D, D and the belt is slightly loose, it will be noted that by turning the screw $f^2$ so as to push the block $f$ in the direction towards the arrow in Fig. 2, both hubs C², C² will be pushed an equal distance slightly inward towards the flanges H of the two expanding pulleys and this will cause a slight increase in the diameter of the pulleys sufficient to take up any slack in the belt. This increase will be the same in both pulleys. This having been accomplished, the apparatus is then in condition for use and may be adjusted according to the variations in speed required or desired. I do not mean to limit myself, however, to this exact arrangement between the two pulleys as the same results may be accomplished otherwise. It will be noted that supposing the diameter of the two pulleys, the one expanded the other contracted, to be as 2 to 1, by reversing the position of the two hubs the ratio will be reversed and become as 1 to 2. It will also be noted that by placing two of these pulleys upon the same countershaft, power taken from a similar pulley on the main shaft may be multiplied or divided as occasion may require.

I do not limit myself to the exact construction of expanding pulley shown herein, although I believe that to embody my invention in its best form, for the reason that a positive movement is given to the expanding sections of the pulley both while expanding and contracting, and a given movement of the levers in either direction must always produce the same corresponding movement of the expanding sections, which is not always the case where a cam movement is provided for this purpose.

What I claim as my invention is:—

1. An expansible pulley comprising two flanges, sections adapted to be moved radially between said flanges, and means for moving said sections comprising a shaft, a hub slidable on said shaft, a series of levers each fulcrumed on one of said flanges and a series of links each connecting one of said levers with one of said sections as described.

2. An expansible pulley comprising two flanges, sections adapted to be moved radially between said flanges, and means for moving said sections comprising a series of levers and means for moving them, and means for supporting said levers comprising a series of slotted brackets, pins passing through the fulcrums of said levers and a series of clamps resting upon said pins and attached to said brackets as described.

3. An expansible pulley comprising two flanges, sections adapted to be moved radially between said flanges, and means for moving said sections comprising a series of levers and means for moving them, each section having approaching walls forming jaws and a link pivoted between said jaws, its other end being pivotally connected to one of said levers as set forth.

4. An expansible pulley comprising expansible sections and means whereby they may be expanded, comprising a hub adapted to slide on a shaft, a series of angle levers fulcrumed on said pulley, one end of each of said levers being adapted to slide in said hub at right angles to its axis, and the other being connected to one of said expansible sections, as described.

JAMES E. TUTTLE.

Witnesses:
GEORGE O. G. COALE,
MARTIN V. FOLEY.